(12) United States Patent
Zeyen et al.

(10) Patent No.: US 7,753,440 B2
(45) Date of Patent: Jul. 13, 2010

(54) FAN MODULE FOR A VEHICLE SEAT AND MOTOR VEHICLE SEAT WITH NOISE INSULATION

(75) Inventors: Michael Zeyen, Herxheim-Hayna (DE); Maurice Clauss, Nordhouse (FR); Franz Bohlender, Kandel (DE)

(73) Assignee: Catem GmbH & Co. KG (DE)

( * ) Notice: Subject to any disclaimer, the term of this patent is extended or adjusted under 35 U.S.C. 154(b) by 43 days.

(21) Appl. No.: 11/934,390

(22) Filed: Nov. 2, 2007

(65) Prior Publication Data

US 2008/0129090 A1 Jun. 5, 2008

(30) Foreign Application Priority Data

Nov. 6, 2006 (EP) .................................. 06023045

(51) Int. Cl.
*A47C 7/74* (2006.01)
(52) U.S. Cl. .............................. 297/180.14; 297/180.13
(58) Field of Classification Search ............ 297/180.13, 297/180.14, 452.46, 452.47; 165/248; 62/304, 62/314; 454/120, 906, 907
See application file for complete search history.

(56) References Cited

U.S. PATENT DOCUMENTS

| | | | | |
|---|---|---|---|---|
| 4,724,748 A | * | 2/1988 | Geyer | 454/120 |
| 5,543,198 A | * | 8/1996 | Wilson | 428/116 |
| 5,692,952 A | * | 12/1997 | Chih-Hung | 454/120 |
| 5,783,780 A | * | 7/1998 | Watanabe et al. | 181/229 |
| 5,934,748 A | * | 8/1999 | Faust et al. | 297/180.12 |
| 6,178,764 B1 | | 1/2001 | Tanaka et al. | |
| 6,224,150 B1 | * | 5/2001 | Eksin et al. | 297/180.1 |
| 6,589,112 B2 | * | 7/2003 | Ruach | 454/276 |
| 6,644,735 B2 | * | 11/2003 | Bargheer et al. | 297/180.13 |
| 6,840,576 B2 | * | 1/2005 | Ekern et al. | 297/180.14 |
| 6,848,742 B1 | * | 2/2005 | Aoki et al. | 297/180.14 |
| 6,929,322 B2 | * | 8/2005 | Aoki et al. | 297/180.14 |
| 6,971,474 B2 | * | 12/2005 | Prosser et al. | 181/198 |
| 6,976,734 B2 | * | 12/2005 | Stoewe | 297/180.14 |
| 7,201,441 B2 | * | 4/2007 | Stoewe et al. | 297/180.14 |
| 7,213,876 B2 | * | 5/2007 | Stoewe | 297/180.14 |
| 7,275,984 B2 | * | 10/2007 | Aoki | 454/120 |
| 2003/0102699 A1 | * | 6/2003 | Aoki et al. | 297/180.14 |
| 2003/0197404 A1 | * | 10/2003 | Ekern et al. | 297/180.11 |
| 2005/0284692 A1 | * | 12/2005 | McWilliam et al. | 181/258 |
| 2006/0290175 A1 | * | 12/2006 | Hartwich | 297/180.1 |

(Continued)

FOREIGN PATENT DOCUMENTS

DE 19533270 3/1997

(Continued)

*Primary Examiner*—David Dunn
*Assistant Examiner*—James Alex
(74) *Attorney, Agent, or Firm*—Boyle Fredrickson, S.C.

(57) ABSTRACT

A fan module for a vehicle seat, comprising a housing which defines at least one portion of an air-conducting duct and accommodates an air conveyor providing, in a position of use, an airflow inside the duct. To reduce disturbances caused by noise during the operation of the fan module it is proposed that the housing and/or the duct comprises at least one sound outlet opening in the flow direction of the airflow downstream behind the air conveyor and transversely with respect to the flow direction of the airflow, which is covered by a sound-absorbing material.

6 Claims, 6 Drawing Sheets

U.S. PATENT DOCUMENTS

2006/0290176 A1 * 12/2006 Aoki .................. 297/180.1
2007/0120400 A1 * 5/2007 Westh et al. .......... 297/180.13

FOREIGN PATENT DOCUMENTS

| | | |
|---|---|---|
| DE | 19918269 | 10/1999 |
| DE | 19943246 A1 * | 3/2001 |
| DE | 10054010 | 1/2002 |
| DE | 10160799 A1 * | 9/2002 |
| EP | 1479918 | 11/2004 |

* cited by examiner

FAN MODULE FOR A VEHICLE SEAT AND MOTOR VEHICLE SEAT WITH NOISE INSULATION

BACKGROUND OF THE INVENTION

1. Field of the Invention

The present invention relates to a fan module for a vehicle seat. . Moreover, the invention relates to a motor vehicle seat having a fan module located therein.

2. Description of the Related Art

Fan modules of this type serve the fast and nearly instantaneous setting of pleasant air conditions. The air can be supplied or carried off by the fan module. Specifically in open vehicles such as a cabriolet, a roadster or the like air conditions limited, with regard to space, to the surroundings of the vehicle seat and a person seated on the same, specifically to the neck region of the person, can be created in an open passenger compartment.

These pleasant air conditions can be strongly influenced by noise occurring during the operation of the fan module. Therefore, it is proposed in DE 101 60 799 A1 to transfer a generic fan module upwardly behind an upholstered headrest or backwardly to the backside of a seat back of the vehicle seat. Depending on the operating condition of the fan module a clearly audible noise occurs, e.g. if a large amount of air is conveyed. A sound pattern emitted by the source of the noise is more or less "transmitted" by the airflow. This sound pattern is perceived particularly easily by a person seated on the vehicle seat if the airflow is oriented in the direction of his ear.

OBJECT OF THE INVENTION

Therefore, it is the object of the present invention to provide a fan module that reduces the aforementioned noise and allows a cost-efficient fabrication of a series product.

According to the invention this object is achieved by providing a fan module comprising a housing which defines at least one portion of an air-conducting duct and accommodates an air conveyor providing, in a position of use, an airflow inside the duct. At least one of the housing and the duct comprises at least one sound outlet opening in the flow direction of the airflow downstream behind the air conveyor and transversely with respect to the flow direction of the airflow, which is covered by a sound-absorbing material.

It is another object of the present invention to provide a motor vehicle seat that reduces the noise occurring during the operation.

It is of particular significance for the present invention that a sound wave emanating from the source of the noise of the fan module can be extracted from the duct, at least partially, through the sound outlet opening. The exiting sound wave is more or less "swallowed" or "extinguished" by the sound-absorbing material.

The sound wave propagates in a spherical manner from the source of the noise in all directions in space. If the oscillating air is moved during the operation of the fan module, also sound interferences and frequency shifts to the audible range can occur. The sound wave repeatedly acts on the housing and/or the duct and makes them oscillate, with a part thereof being reflected. The sound outlet opening arranged transversely with respect to the flow direction of the airflow reduces such reflection phenomena to a considerable extent. To this end, the sound outlet opening is covered with a sound-absorbing material.

A particularly efficient noise reduction can be achieved if the sound outlet opening is arranged as closely as possible to the source of the noise. Therefore, it is particularly advantageous to provide the sound outlet opening on the housing behind the air conveyor.

The terms "behind" or "downstream" and "in front of" or "upstream", respectively, are used in this description with respect to the flow direction of the airflow. It will be appreciated by the person skilled in the art that the air conveyor can produce bi-directional airflows.

Mobile elements of an air conveyor, the driving means thereof as well as means for limiting and diverting the air flow are regarded as the source of the noise. Specifically, the latter means are connected to the duct which receives the airflow. Turbulences may occur in the duct in response to the temperature and the flow velocity of the air. These turbulences, which are perceived as a noise, additionally occur at tapers and bends of the duct. For reducing such a noise it is, therefore, advantageous to place the sound outlet opening downstream and closely to the source of the sound. If, during the suction operation of the air conveyor, the duct ends downstream in the interior of the vehicle, the housing comprises sound outlet openings on both sides of the air conveyor along the duct.

In the present description, the term duct includes both a duct merely formed by the fan module and a multipart duct system with a separate duct section attachable to the housing. The duct section can be, for example, a recess provided by the vehicle seat.

To obtain particularly pleasant air conditions the airflow is heatable. To this end, a heater is provided inside the duct. Specifically, this heater can be operated with electric energy as well as variably, wherein the airflow encounters a flow obstruction or flows past the same, respectively. According to a particularly advantageous embodiment of the invention it is, therefore, provided to arrange the sound outlet opening between the air conveyor and the heater or behind the heater, respectively.

A modern vehicle seat offers a plurality of adjustment possibilities for a seat position. For the positioning of its duct outlet at the downstream end the duct is specifically provided with flexible and/or bent sections. Again, turbulences may occur if the duct is varied in length and/or if the airflow is diverted. If the airflow is to be oriented towards specific parts of the body, e.g. parts of the head, face, back, shoulders, such sections are arranged close to the duct outlet. According to a particularly advantageous embodiment of the invention the sound outlet opening is provided within this section.

Also, noise can be generated between the housing and the mobile parts of the air conveyor. If the air conveyor is located on the fan module, moreover, the housing may be caused to oscillate. To reduce these noises, the fan module can be developed further in such a way that the housing is embodied in the form of two corresponding shells having a U-shaped cross section, wherein the sound outlet opening is recessed in a wall of the shells. When the fan module is in use, the wall extends approximately parallel to the seat surface of the vehicle seat.

The two-part embodiment of the housing allows a limitation of the noise development to one shell by the resonance with the mobile parts. The wall thereof, which is provided with the sound outlet opening, can be oriented towards the seat surface, wherein a knitted fabric extending between an upper material of the vehicle seat and the fan module may serve as an additional sound-absorbing material.

This effect can be taken advantage of in multiple ways. Thus, a fan module according to an advantageous advancement of the invention is embodied in such a way that another sound outlet opening is provided in the wall of the second shell, which is placed opposite the sound outlet opening of the first shell. A slim duct may be provided with the sound outlet openings on the opposite broad sides of the shell, wherein said sound outlet openings are, in the position of use, enclosed by the foam-including upper material of a vehicle seat.

To extract the sound in a specific section to an almost complete extent as it impinges on the duct it is provided by another advantageous embodiment of the fan module that the sound opening comprises a plurality of bores. This additionally brings about the advantage that the sum of the surface areas of the bores results in a relatively large recess for the sound outlet opening, while the housing is hardly influenced in a negative way as far as its strength and rigidity is concerned.

As the sound propagates from the source of the sound concentrically within the duct, it is provided in an advantageous embodiment of the invention that the bores extend substantially over the entire width of the duct.

Any products that reduce a sound transmission and are known in the expert circles may be used as sound-absorbing material. These products include, for example, foams having a small bulk density and formed bodies having a surface that reflects the sound totally. Particularly advantageous is the use of a foamed material as sound-absorbing material. Such foamed materials are not only low-priced, but also flexible to ensure a complete coverage of the sound outlet opening.

One embodiment of the invention, which is particularly cost-efficient for the mass production, provides that the housing provided with the sound outlet opening is wrapped with the foamed material around its circumference. The foamed material thus covers at least that part of the housing on which the sound openings are distributed.

Upholsteries of a vehicle seat are suited as another sound-absorbing material. Such upholsteries include, for example, foamed materials that improve the seating comfort. For a better ventilation, the upholstery comprises spaces of an irregular shape which are filled with air. These spaces can attenuate the impinging sound waves. Another embodiment of the fan module according to the invention therefore provides that one part of the vehicle seat comprises a cover coated with the foamed material that covers the sound outlet opening. The cover may serve to close an above-described recess in the vehicle seat, which provides both the duct section and a cavity that receives the fan module. Hence, it is possible to retrofit, maintain, repair or, if necessary, exchange the fan module according to the invention.

The fan module according to the invention can be used as neck or head heating. According to another embodiment of the invention the fan module is, for this purpose, developed further in such a way that it can be integrated into the back of a vehicle seat and that the duct thereof inside the seat back can be oriented to end downstream on the upper edge of the vehicle seat in the direction of the seat surface.

For the purpose of noise optimization the fan module can be embodied in accordance with the aforementioned embodiments. The duct in this vehicle seat reaches to the neck region so as to protect persons sitting on the same against health and comfort affecting blasts, e.g. if the passenger compartment is open. The airflow exiting from the duct is here particularly well audible. To minimize noises generated during the operation it is provided that the duct and/or the housing comprises a sound outlet opening disposed transversely with respect to the airflow, said sound outlet opening being covered by a sound-absorbing material.

Additional features and advantages of the invention are shown in the following description of several embodiments and in the drawings to which reference will be made below. In the drawings:

DETAILED DESCRIPTION OF THE PREFERRED EMBODIMENT

Figure 1:
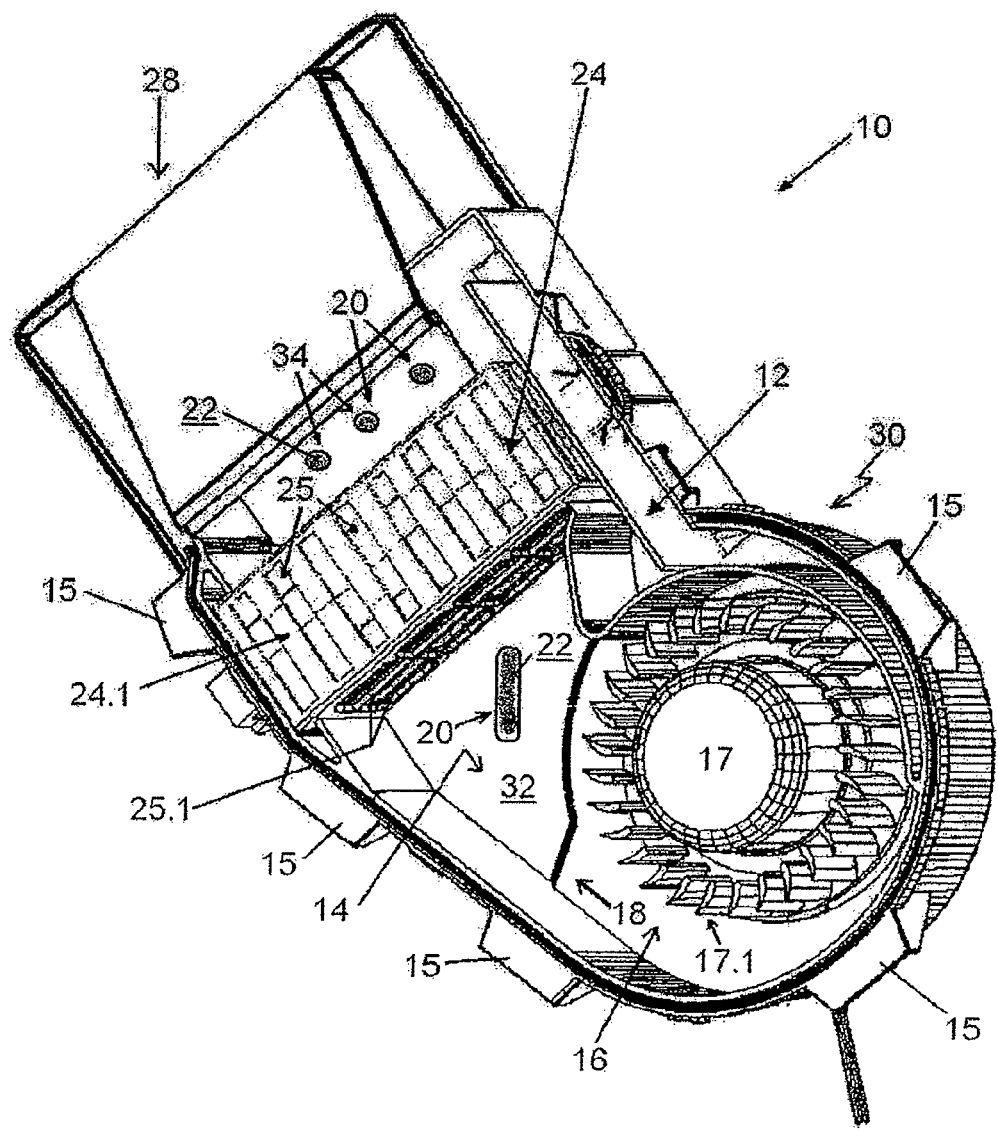
FIG. 1 shows a first embodiment of a fan module according to the invention with a partial section of the housing.

Unless deviating statements are made below, the following description always applies to all of the figures and like reference numerals always refer to like constructive features.

A fan module 10 shown in FIG. 1 serves the air conditioning of a vehicle seat 100 herein not shown in more detail. The fan module 10 comprises a housing 12, which forms an air-conducting duct 14 in the form of a rectangular tube. The duct 14 is divided into a first section and a second section, wherein the first section, which accommodates an air conveyor 16, is formed of two shells 30. One of the shells 30 is provided, on its outside, with clips 15 for the airtight closure of the mating shells 30. The air conveyor 16 comprises a rotatably mounted rotor 17 which can be driven via a shaft by an electrically operated EC motor. Depending on the direction of rotation of the rotor 17 an airflow 18 can be provided inside the duct 14 during the operation of the fan module 10. In the embodiment shown in FIG. 1, the air flows downstream into the second section of the duct 14, which is embodied in the form of a spout and tapers toward the duct outlet 28.

As the air conveyor is operating, it is natural that oscillations occur, which can be transferred as a source of noise to an air column flowing through the duct 14. At a high speed of the rotor 17, moreover, turbulences are produced between the rotor blades 17.1 and the housing 12. The sound waves thereof propagate in all directions in space and are transported, above all, by the airflow 18 in the direction of the duct outlet 28. Additionally, the airflow 18 can cause a frequency shift to the frequency response that is perceivable by the human ear, so that also vibrational oscillations are audible. These occur specifically as the speed varies.

As the sound wave passes through the duct 14, it is reflected multiple times by the housing 12 and other duct sections forming the duct 14, which can also be connected to the housing 12 separately. To reduce the sound wave, a sound outlet opening 20 is incorporated in one wall 32 of the shell 30. The sound outlet opening 20 extends transversely with respect to the airflow 18, wherein the sound wave can exit the duct 14 while only small portions of the airflow 18 escape due to the small pressure difference between the duct interior and the ambience.

Moreover, these losses are further reduced by a sound-absorbing material 22 covering the sound outlet opening 20. However, the sound waves are mainly attenuated by the sound-absorbing material 22. To this end, it is enough if the sound-absorbing material 22 is placed onto the sound outlet opening 20.

For controlling the temperature of the airflow 18 a heater 24 is arranged downstream behind the air conveyor 16. The heater 24 holds a number of resistance heating elements 25 inside a frame 24.1, with the associated lamellae 25.1 thereof being acted on by the airflow 18. Specifically if the conveying performance of the air conveyor 16 is high, the airflow 18 accumulates at the lamellae 25.1 and causes the lamellae 25.1 to oscillate as it flows against them. Inside the duct 14 such oscillations propagate in the form of sound waves between the air conveyor 16 and the heater 24. The sound waves propagating transversely with respect to the airflow 18 impinge on the sound outlet opening 20, which is arranged downstream behind the air conveyor and in front of the heater, and exit the housing 12. The sound-absorbing material 22 prevents a further propagation of sound waves outside the housing 12 and a sound reflection inside the duct 14.

Furthermore, a noise or beat noise can occur as a result of the airflow 18 flowing through the heater 24, its exiting at the downstream end of the lamellae 25.1 and due to the expansion of the heated air. In the embodiment of the fan module 10 shown in FIG. 1, therefore, an additional sound outlet opening 20 is arranged downstream of the heater 24. The sound outlet opening 20, which is provided behind the heater 24 with respect to the airflow 18, comprise a plurality of bores 34 covered by a sound-absorbing material 22.

Figure 2:
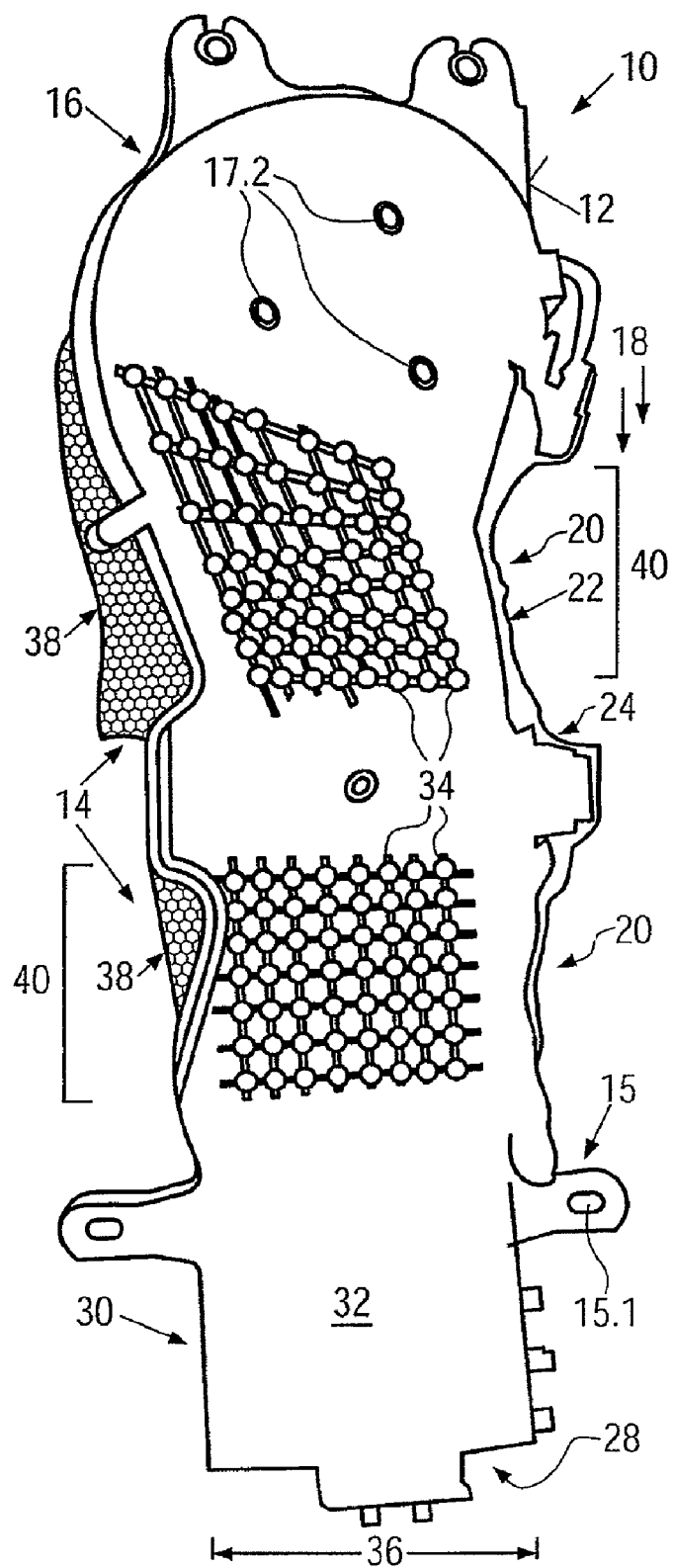
FIG. 2 shows a top view of a second embodiment of a fan module according to the invention.

The embodiment of an inventive fan module 10 shown in FIG. 2 and comprising a housing 12 is illustrated in a view from outside. The housing 12 is comprised of two corresponding shells 30 having a substantially U-shaped cross section, wherein the top view mainly shows the upper shell 30 facing the seat back. The shells 30 accommodate an air conveyor 16 and a heater 24. The air conveyor 16 is fixed to the shell 30 by means of three fixing means 17.2. In the position of use, the air conveyor 16 generates an airflow 18 within a duct 14, which exits at a downstream duct outlet 28. The shell 30 comprises a sound outlet opening 20 both between the air conveyor 16 and the heater 24, which includes a PTC not illustrated herein in more detail, and between the duct outlet 28 and the PTC. These sound outlet openings 20 defined by a plurality of bores 34 extend over the entire width 36 of the duct 14. The bores 34 are recessed in several rows in a wall 32 of the shell 30. As can be seen particularly from FIG. 4, the fan module 10 can be positioned with respect to a seat surface 102 of the vehicle seat 100 in such a way that the wall 32 extends approximately parallel to the seat surface 102. On the clips 15, which are formed laterally of the shell 30, oblong holes 15.1 are provided to fix the fan module 10 to a support structure of the vehicle seat 100 not shown in more detail.

The two shells 30 of the fan module 10 shown in FIG. 2 are wrapped by a sound-absorbing material 22, by sparing the heater 24. Thus, oscillations transmitted from the fixing means 17.2 of the air conveyor 16 to the housing 12 are attenuated. The sound-absorbing material 22 includes a foamed material 38. This foamed material 38 is embodied in the form of a flexible cloth which covers at least the area 40 around the sound outlet openings 20, whereby it is wrapped around the housing 12. For the purpose of a better illustration, the foamed material 38 has been removed from the upper side of the housing 12 in FIG. 2.

Figure 3:
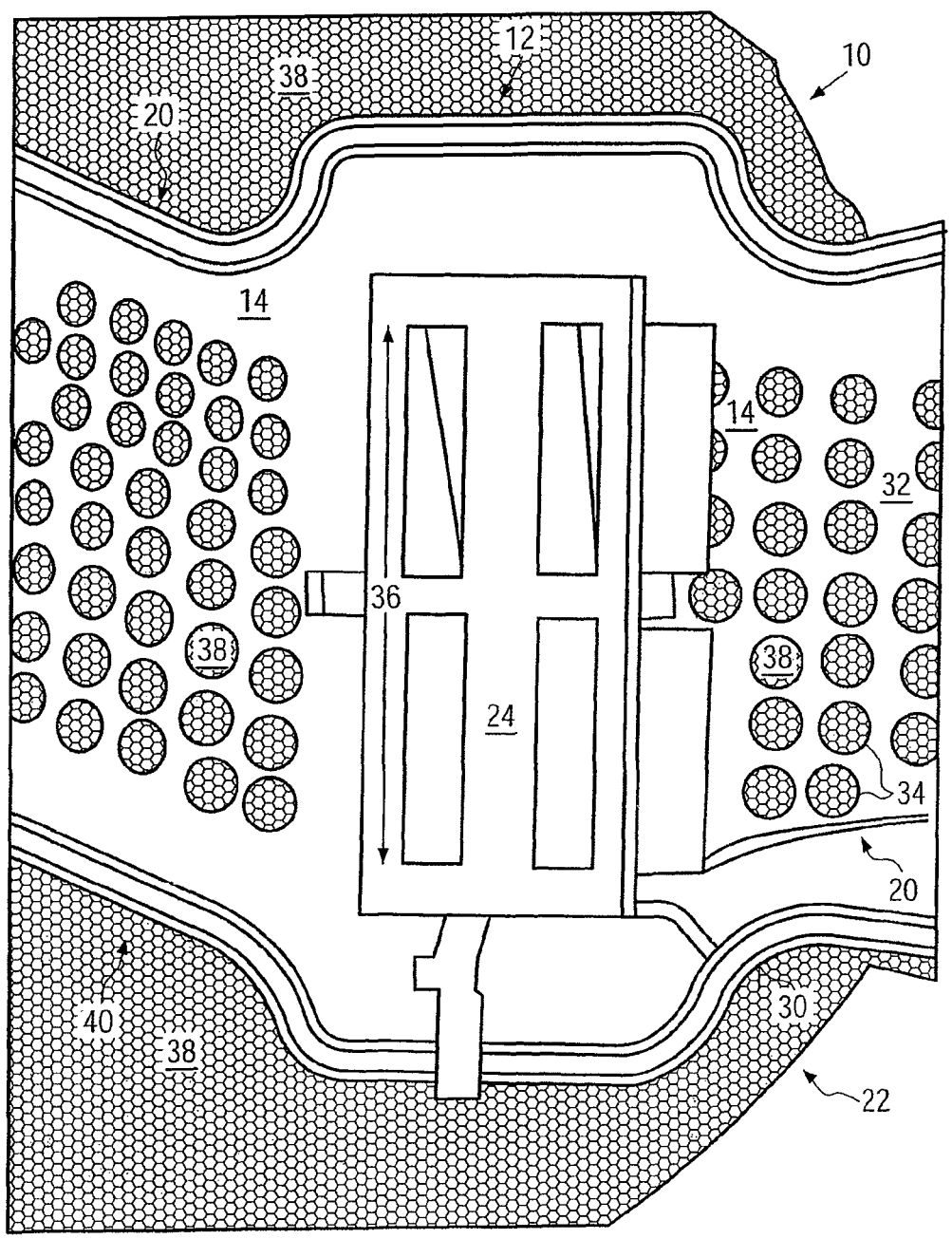
FIG. 3 shows a top view of a housing part of the second embodiment with the housing being opened.

FIG. 3 shows the central part of the above-explained embodiment of a fan module 10 wherein, for the sake of simplicity, one shell 30 covering the duct 14 has been omitted. The first shell 30 of the housing 12 shown herein has a substantially U-shaped cross section which, in the position of use, limits an air-conducting duct 14 in a tube-like manner. Inside the housing 12, the duct 14 is divided by the heater 24. An airflow 18 oriented towards the heater 24 is heated as it flows through the heater 24. In the area of the housing 12 accommodating the heater 24 the duct 14 becomes wider. The alteration of the cross section of the duct 14 causes eddies and turbulences in the flow, the sound waves of which propagate in all directions in space. To attenuate these sound waves, sound outlet openings 20 are respectively arranged in a wall 32 of the shell 30 on both sides of the heater 24. The shell 30 of the housing 12 shown herein is provided with a sound-absorbing material 22 from underneath and covers the area 40 around the sound outlet openings 20. The sound outlet openings 20 are defined by a number of bores 34 which are covered by a foamed material 38 of the sound-absorbing material 22. The sound waves generated in use reach the foamed material 38 via the sound outlet openings 20. The foamed material 38 comprises several spaces that reduce the bulk density thereof, whereby a noise reduction is achieved by a total reflection of the sound.

Figure 4:
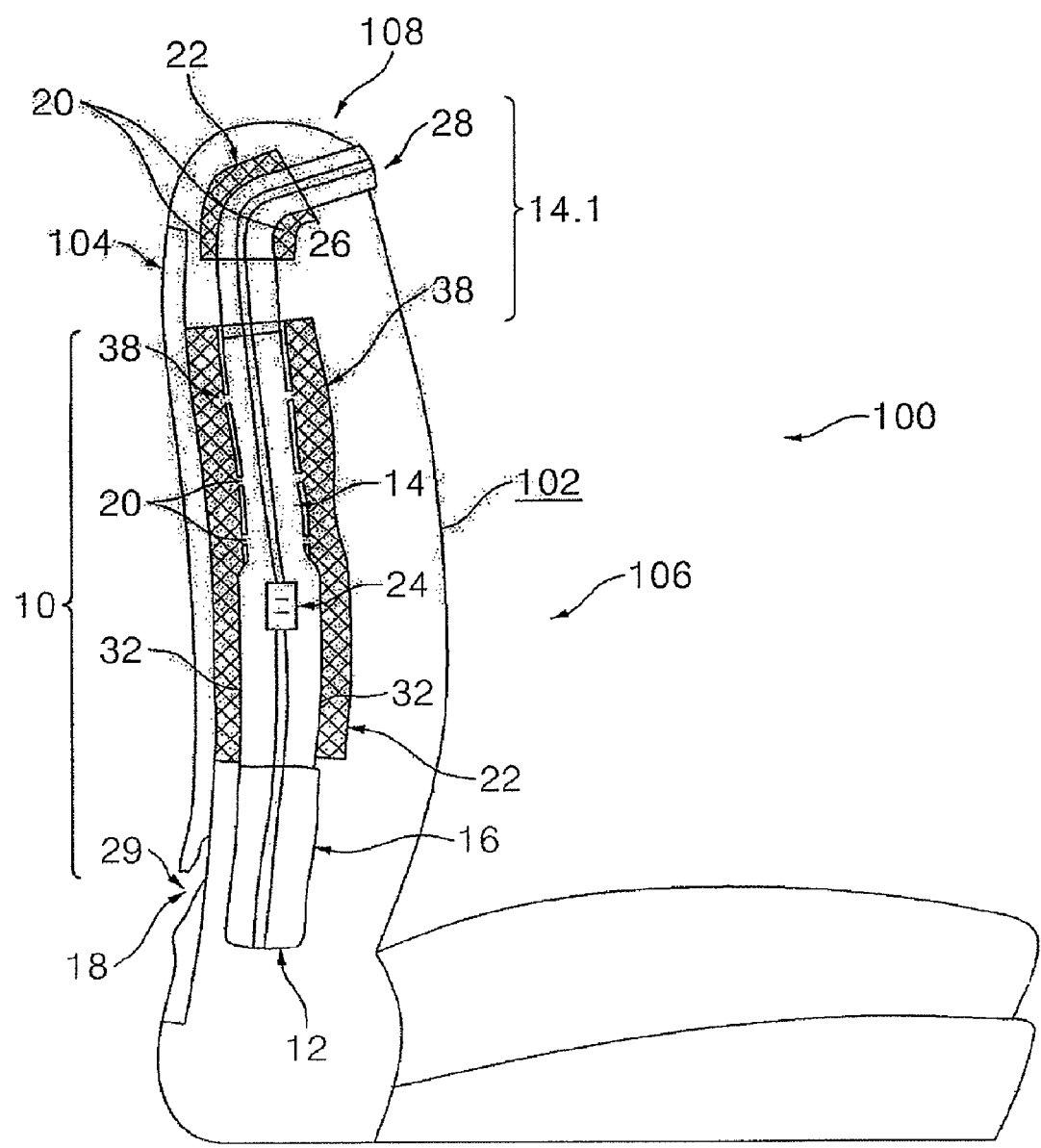
FIG. 4 shows a schematic longitudinal section of a first example of a vehicle seat comprising an embodiment of a fan module according to the invention.

FIG. 4 shows a vehicle seat 100 in the seat back 106 of which a fan module 10 according to the invention is integrated. An air-conducting duct 14 at least partially defined by the housing 12 is herein arranged in such a way that its downstream duct outlet 28 ends closely to the upper edge 108 of the vehicle seat 100. The other end of the duct 14 ends in a cover 104 of the seat back 106. In use, an airflow 18 is sucked through the air inlet opening 29 into the duct 14 by means of the air conveyor 16, which is arranged in the housing 12 of the fan module 10, and is heated by a heater 24 to which the airflow 18 is supplied. Any noises occurring thereby are transported by the airflow 18 and the housing 12, which reflects sound waves, along the duct 14 to the duct outlet 28. The sound waves are extracted through the sound outlet openings 20, which are incorporated in the housing 12 and the duct 14, respectively, transversely with respect to the airflow 18. The duct 14 illustrated in a cross section comprises two opposite walls 32 extending approximately parallel to the seat surface 102 and the cover 104 on the backside, respectively. A foamed material 38 is provided between the seat surface 102 and the wall 32 facing the seat surface 102, which serves as a sound-absorbing material 22 because the foamed material 38 covers the sound outlet openings 20. The cover 104 is covered with foamed material 38. This particularly easily deformable foamed material 38 extends at least in the area 40 of the housing 12 and the duct 14, which are likewise broken through by sound outlet openings 20. The sound exiting through these sound outlet openings 20 is, more or less, "swallowed" by the foamed material 38 of the cover 104.

As is shown in FIG. 4, the duct 14 is defined by both the housing 12 and by a separate duct section 14.1. The duct section 14.1 comprises an arch 26 close to the duct outlet 28 so as to orient the airflow 18 away from the seat surface 102 in the direction of a herein not illustrated person sitting on the vehicle seat 100. As the airflow 18 is diverted within the arch 26, naturally turbulences occur, which cause well audible noises specifically if the airflow 18 exits at the upper edge 108. Another sound outlet opening 20 is arranged inside the arch 26, wherein sound waves occurring in the same are attenuated by a sound-absorbing material 22 that covers the sound outlet opening 20.

Figure 4A:
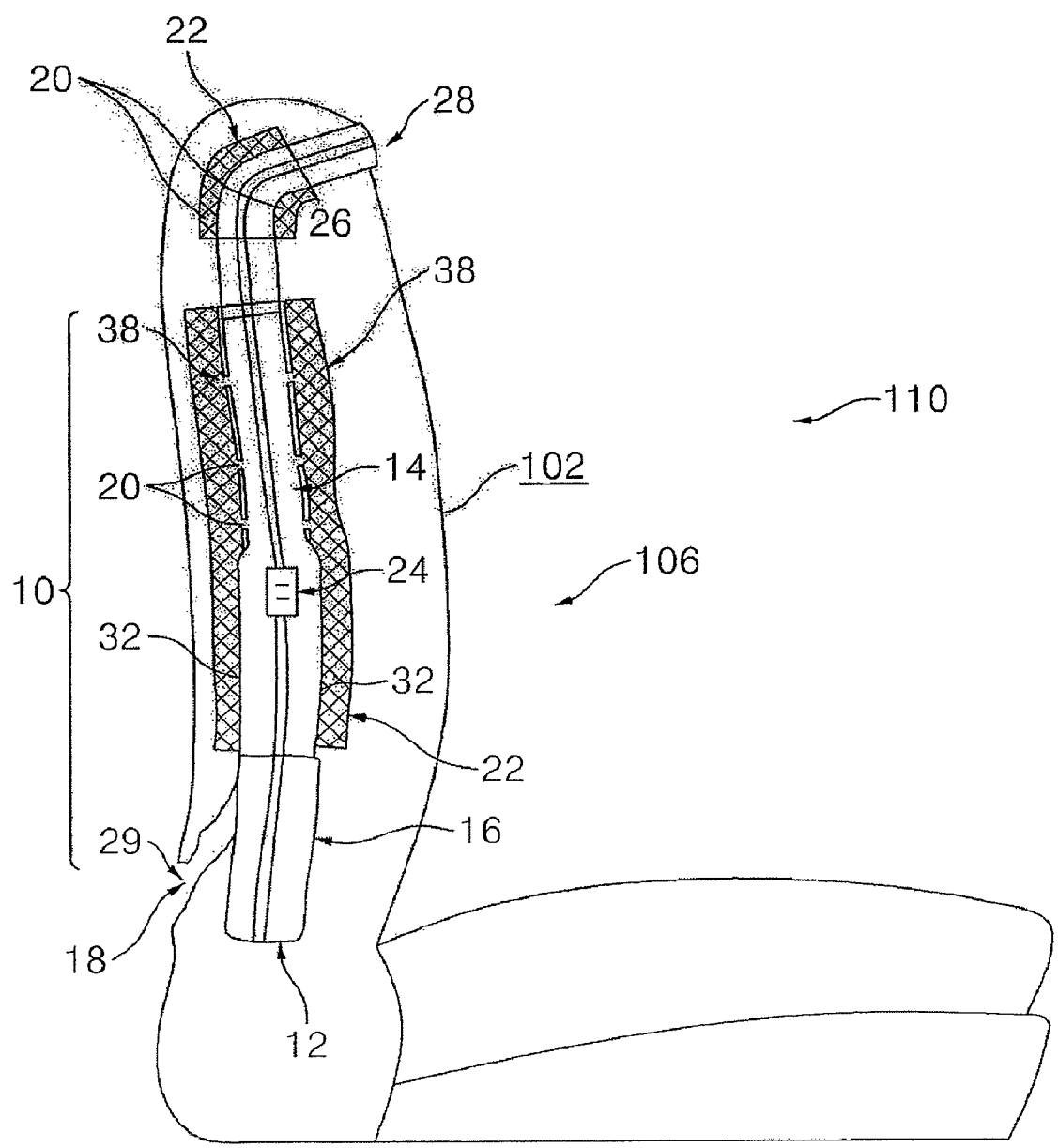
FIG. 4a shows a schematic representation of a cross section of a motor vehicle seat according to the invention.

FIG. 4a shows a motor vehicle seat 110 comprising a fan module 10 which is integrated in the seat back 106. The fan module 10 defines a tubular duct 14 which extends up to the neck region of a person sitting on the same. The housing 12 accommodates an air conveyor 16 which, in use, provides an airflow 18 within the duct 14. Additionally, a heater 24 fixed to the housing 12 is provided in the duct 14. Further downstream, behind the air conveyor 16 and the heater 24 and close to the duct outlet 28, an arch 26 is defined by the duct 14, which is provided with a sound outlet opening 20 extending approximately transversely with respect to the airflow 18, i.e. in the longitudinal extension of the housing 12. The sound exiting through the same is stopped by a material 22 covering the sound outlet opening 20. A shifting portion of the duct 14, which is formed in a telescopic manner, allows a variable positioning of the duct outlet 28, which is likewise broken through by sound outlet openings 20 covered with the sound-absorbing material 22. The housing 12 is partially limited by two opposite walls 32 which extend substantially parallel to the seat surface 102. These walls 32 are broken through by sound outlet openings 20 which are aligned transversely with respect to the airflow 18. The sound outlet openings 20 extend between the air conveyor 16 and the heater 24 as well as downstream of the heater 24. To further attenuate the sound, these sound outlet openings 20 of the housing 12 are covered by a foamed material 38 as sound-absorbing material 22.

Additional features of the fan module 10 of the motor vehicle seat 110 are explained in the aforementioned examples.

EXAMPLES

For comparison purposes different fan modules were tested in view of their noise development during operation, whereby the embodiments of fan modules described below were used to collect series of measurements.

1. A fan module according to the prior art for a vehicle seat, comprising a housing that defines at least one portion of an air-conducting duct and accommodates an air conveyor which, in use, provides an airflow inside the duct.
2. A fan module A comprising the aforementioned features, wherein the housing accommodates a heater supplied with the airflow, and wherein a sound outlet opening is recessed in the housing between the air conveyor and the heater as well as transversely with respect to the flow direction of the airflow, said sound outlet opening being covered by a sound-absorbing material.
3. A fan module B comprising the features of fan module A, wherein an additional sound outlet opening covered with a sound-absorbing material is arranged downstream of the heater.
4. A fan module C comprising the features of fan module B, wherein an additional sound outlet opening also covered with a sound-absorbing material is provided inside an arch defined close to the duct outlet.

Figure 5:
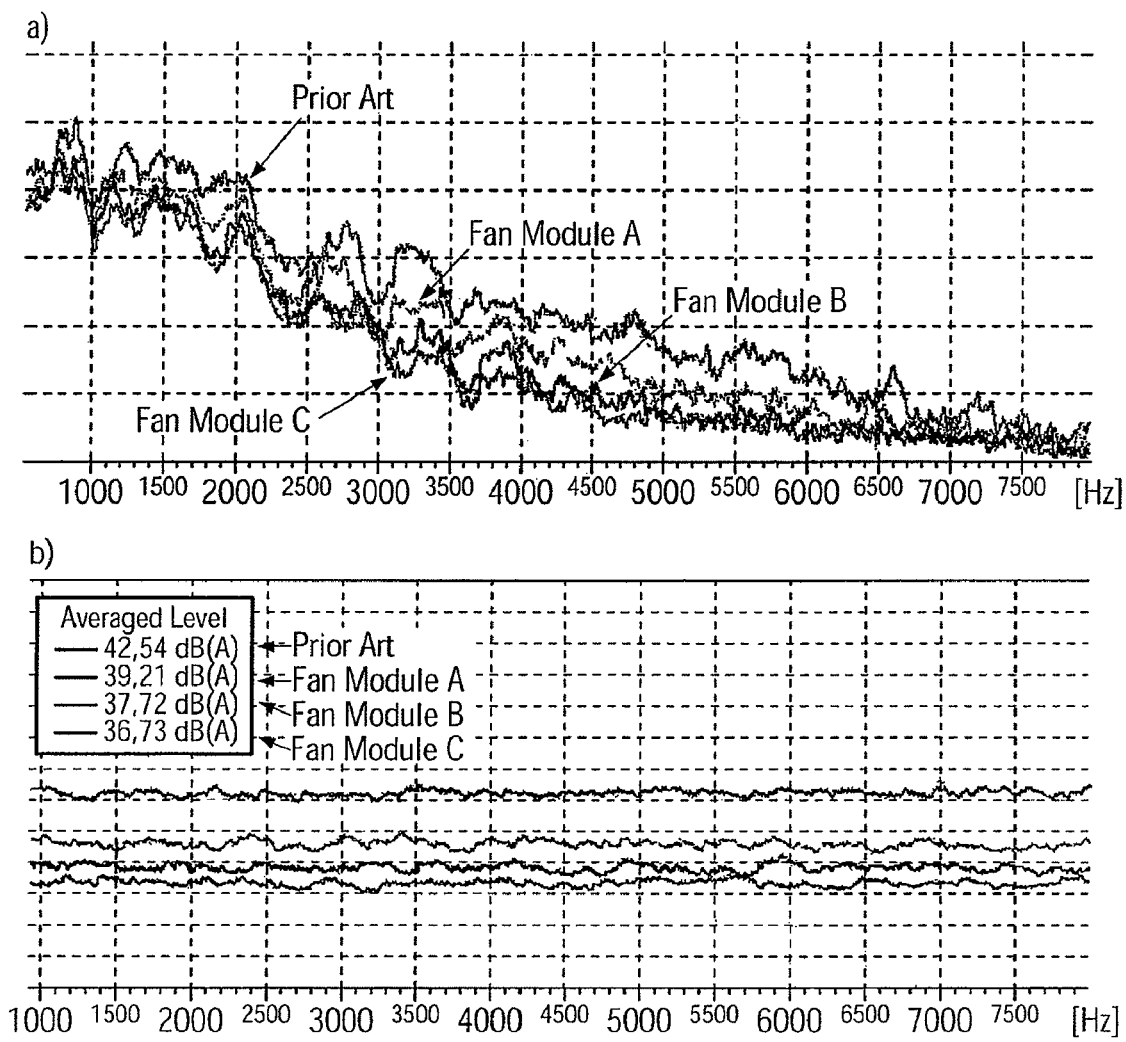
FIG. 5a shows a sonogram representing series of measurements of different fan modules and of the prior art.
FIG. 5b shows a diagram representing loudness levels over the time of different fan modules and the prior art.

The results of these comparative series of measurements are plotted as loudness over frequency in the form of a sonogram according to FIG. 5*a*.

FIG. 5*b* shows the loudness over the time of the aforementioned embodiments of different fan modules.

It can clearly be seen from the graphs of the comparative measurements that the maximums of the loudness level in a frequency range below 1000 Hz, between 2500 Hz and 3000 Hz and from 3000 Hz to approximately 3500 Hz of the fan module designated as "prior art" are reduced by the additional features of the fan modules A to C (FIG. 5*a*).

As compared to the fan module according to the prior art, the mean noise level is reduced by the additional features of the above-described fan modules (FIG. 5*b*).

The present invention discloses a fan module and a motor vehicle seat with a noise insulation that achieves, with technically simple means, an effective reduction of operating noises and allows, thanks to its technical embodiment, a low-priced mass production.

We claim:

1. A fan module for a vehicle seat, comprising:
a housing including two corresponding shells each having a substantially U-shaped cross section, the housing defining at least one portion of an air-conducting duct and accommodates an air conveyor providing, in a position of use, an airflow inside the duct, the fan module being integrated into a seat back of a vehicle seat such that the duct extends toward and ends proximate to an upper edge of the seat back, wherein at least one of the housing and the duct comprises multiple sound outlet openings in the flow direction of the airflow downstream of the air conveyor and downstream of a heater arranged inside the duct, wherein at least one of the multiple sound outlet openings is arranged inside an arch of the duct close to a duct outlet, the multiple sound outlet openings extending transversely with respect to the flow direction of the airflow, wherein the at least one of the multiple sound outlet openings is covered by a sound-absorbing material, wherein the multiple sound outlet openings are recessed on a pair of opposing walls of the at least one of the housing and the duct, the opposing walls extending parallel to the seat back of the vehicle seat, wherein the sound-absorbing material is made of a foamed material, and wherein the foamed material forms a part of a cover of the vehicle seat.

2. The fan module according to claim 1, further comprising at least one sound outlet opening provided on the housing between the air conveyor and the heater.

3. The fan module according to claim 1, wherein the housing is wrapped with the foamed material around an outer perimeter thereof, in the area of the multiple sound outlet openings.

4. The fan module according to claim 1, wherein each sound outlet opening is arranged inside an arch of the duct close to the duct outlet.

5. The fan module according to claim 1, wherein each of the multiple sound outlet openings is defined by a plurality of bores.

6. The fan module according to claim 5, wherein the bores are distributed approximately over the entire width of the duct.

* * * * *